United States

Ikeda et al.

3,998,527

Dec. 21, 1976

[54] WIDE-ANGLE PHOTOGRAPHIC LENS SYSTEM WITH A SHORT OVERALL LENGTH

[75] Inventors: Yoshitsugi Ikeda, Hachiouji; Yoshio Nishimoto, Hamura, both of Japan

[73] Assignee: Olympus Optical Co., Ltd., Tokyo, Japan

[22] Filed: May 13, 1975

[21] Appl. No.: 577,016

[30] Foreign Application Priority Data

May 14, 1974 Japan .................. 49-52836

[52] U.S. Cl. ........................ 350/189; 350/228
[51] Int. Cl.$^2$ .................... G02B 9/12; G02B 13/18
[58] Field of Search ............... 350/227, 228, 189

[56] References Cited
UNITED STATES PATENTS 2,833,181    5/1958    Bertele .................... 350/228

*Primary Examiner*—John K. Corbin
*Assistant Examiner*—Conrad Clark
*Attorney, Agent, or Firm*—Cushman, Darby & Cushman

[57] ABSTRACT

A wide-angle photographic lens system with a short overall length comprising three lens components of four lenses, the surface on the object side of the third lens component being formed as an aspherical surface expressed by the following formulas:

$$x = \frac{y^2}{r_6 + r_6 \sqrt{1 - \left(\frac{y}{r_6}\right)^2}} + Ey^4 + Fy^6 + Gy^8 + Hy^{10}$$

$$E > 0, F < 0, G > 0$$

7 Claims, 20 Drawing Figures

FIG. 1
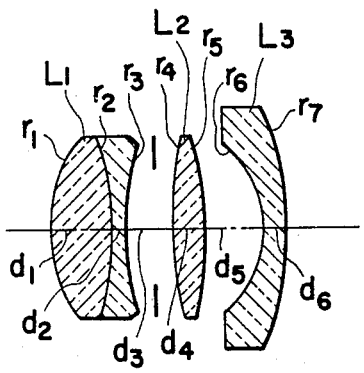
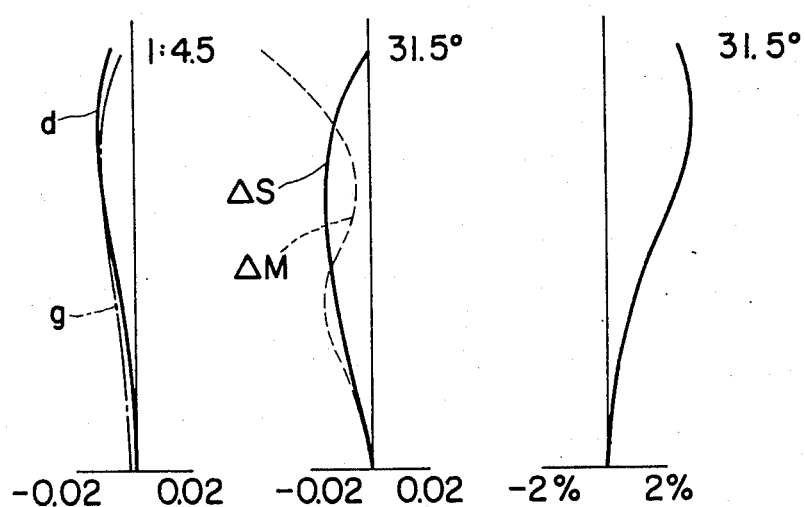
FIG. 2A    FIG. 2B    FIG. 2C
SPHERICAL ABERRATION    ASTIGMATISM    DISTORTION

SPHERICAL ABERRATION

ASTIGMATISM

DISTORTION

SPHERICAL ABERRATION

ASTIGMATISM

DISTORTION

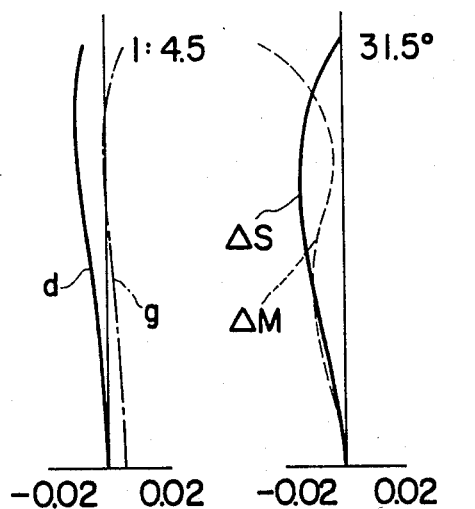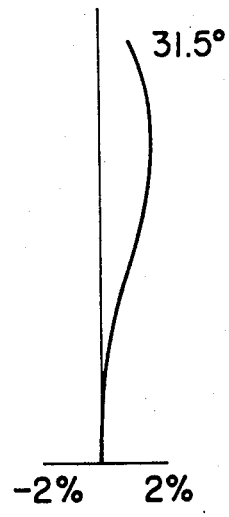
FIG. 5A SPHERICAL ABERRATION
FIG. 5B ASTIGMATISM
FIG. 5C DISTORTION
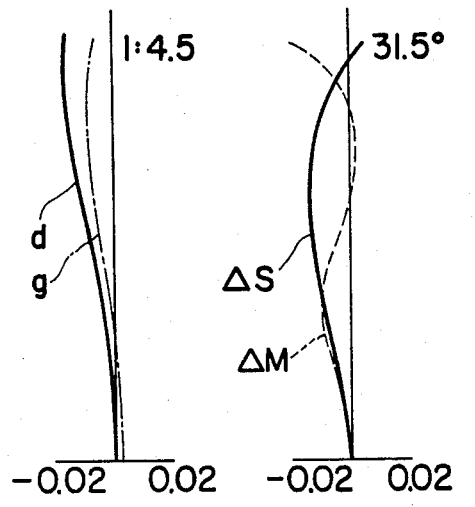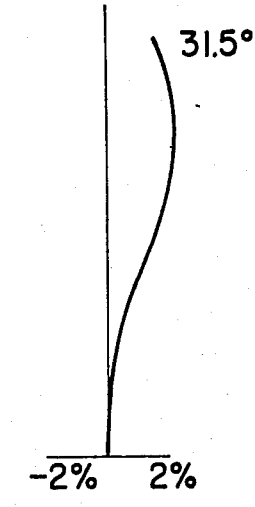
FIG. 6A SPHERICAL ABERRATION
FIG. 6B ASTIGMATISM
FIG. 6C DISTORTION

FIG. 7
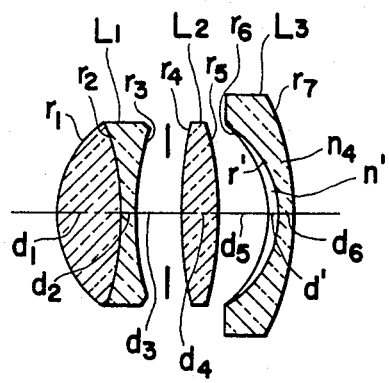
FIG. 8A
SPHERICAL ABERRATION
FIG. 8B
ASTIGMATISM
FIG. 8C
DISTORTION
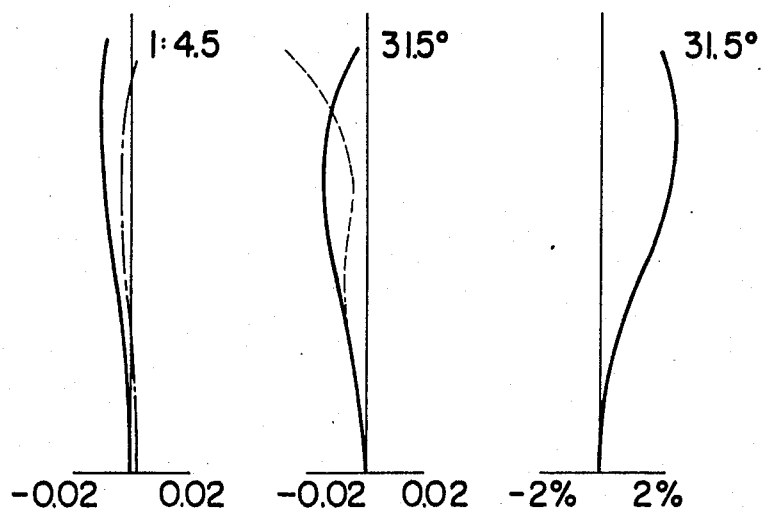

WIDE-ANGLE PHOTOGRAPHIC LENS SYSTEM WITH A SHORT OVERALL LENGTH

BACKGROUND OF THE INVENTION

1. Field of the Invention

The present invention relates to a wide-angle photographic lens system and, more particularly, to a wide-angle photographic lens system having a telephoto ratio (the value obtained by dividing the distance from the first lens surface of the lens system to the imaging plane by the focal length of the lens system as a whole) of about 0.9, short overall length and field angle of 62° or more.

2. Description of the Prior Art

As compact wide-angle photographic lens systems having short overall length like the above, those which have a plural number of aspherical surfaces in the lends system are known. Those lens systems having aspherical surfaces, however, have a disadvantage that it is difficult to produce lenses having aspherical surfaces.

SUMMARY OF THE INVENTION

It is, therefore, a primary object of the present invention to provide a compact wide-angle photographic lens system having an aspherical surface of a shape which can be formed easily and of comparatively small area, especially offaxial aberration of said wide-angle photographic lens system being favorably corrected by means of said aspherical surface.

As shown in FIG. 1, the lens system according to the present invention is of a three-component four-element lens configuration in which a first lens component $L_1$ is a cemented doublet lens consisting of a positive lens and negative lens, a second lens component $L_2$ is a positive lens, and a third lens component $L_3$ is a negative meniscus lens, said lens system according to the present invention satisfying the following conditions when reference symbol $f$ represents the focal length of the lens system as a whole, reference symbol $f_1$ represents the focal length of the first lens component $L_1$, reference symbols $n_1$ and $n_2$ respectively represent refractive indices of respective lenses, i.e., the positive and negative lenses of the first lens component $L_1$, reference symbols $r_4$ and $r_5$ respectively represent radii of curvature of the front and rear surfaces of the second lens component $L_2$, and reference symbol $f_3$ represents the focal length of the third lens component $L_3$.

1. $1.2f < f_1 < 1.8f$
2. $n_2 - n_1 > 0.15$
3. $1.5 < -(r_4/r_5) < 5$
4. $0.4f < -f_3 < 0.8f$

In addition to the above-mentioned configuration, the surface $r_6$ on the object side of the third lens component $L_3$ is formed as an aspherical surface which is expressed by the following formulas (5) when $x$ axis represents the direction of the optical axis and $y$ axis represents the direction perpendicular to the optical axis.

$$x = \frac{y^2}{r_6 + r_6\sqrt{1 - \left(\frac{y}{r_6}\right)^2}} + Ey^4 + Fy^6 + Gy^8 + Hy^{10} \quad (5)$$

$$E > 0, F < 0, G > 0$$

In the lens system of the above-mentioned configuration, the reason why the focal length $f_1$ of the first lens component $L_1$ is limited to the range of $1.2f < f_1 < 1.8f$ as defined by the condition (1) is to well balance the powers of the front lens group on the object side of the stop and of the rear lens group on the image side of the stop. When the focal length $f_1$ of said front lens goup, i.e., the first lens component $L_1$ is made shorter, it is possible to make the overall length of the lends system shorter. When, however, $f_1$ becomes shorter than $1.2f$ shown in the condition (1), it becomes difficult to correct aberrations favorably in case of the lens configuration according to the present invention. When $f_1$ becomes larger than $1.8f$, the overall length of the lens system becomes long and, consequently, the object of the present invention to provide a compact lens system cannot be attained.

The condition (2) is to define refractive indices of the first lens component $L_1$. When the difference of refractive indices of respective lenses of the first lens component $L_1$, which has power satisfying the above-mentioned condition (1), becomes smaller than 0.15, it is not desirable because symmetry of coma will be disturbed and, especially coma of lower rays becomes negative value.

The condition (3) is to define radii of curvature $r_4$ and $r_5$ of surfaces on the object side and image side of the second lens component $L_2$. This condition (3) is established for the purpose of correcting coma and distortion without changing the focal length of the lens system as a whole and overall length of the lens system when the first lens component $L_1$ constituting the front lens group is arranged to satisfy the above-mentioned conditions (1) and (2). When $-(r_4/r_5)$ exceeds the upper limit of the condition (3), pincushion distortion becomes considerably large. When $-(r_4/r_5)$ becomes smaller than the lower limit, distortion can be corrected favorably. In that case, however, coma of upper rays at the marginal portion becomes negative value and, moreover, the meridional image plane will largely incline toward the minus side.

Finally, when the focal length $f_3$ of the third lens component $L_3$ which is a negative meniscus lens is made short, it is advantageous for reducing the overall length of the lens system. If, however, $f_3$ becomes shorter than $0.4f$ defined by the condition (4), Petzval's sum becomes a negative value. Moreover, considerable pincushion distortion is caused and it becomes impossible to correct them by the first lens component $L_1$ and second lens component $L_2$. If the focal length $f_3$ of the third lens component becomes longer than $0.8f$, it becomes impossible to make the overall length of the lens system satisfactorily short by satisfying the conditions (1) through (3).

Besides, even when the lens system is arranged to satisfy the above-mentioned respective conditions, large pincushion distortion cannot be satisfactorily corrected in case of the lens system having the lens configuration as the lens system according to the present invention. If it is attempted to correct pincushion distortion forcibly, coma will be aggravated considerably. To solve the above problem, for the lens system according to the present invention, the concave surface on the object side of the third lens component $L_3$ is formed as an aspherical surface which is expressed by formulas (5). If it becomes $E < 0$ or $G < 0$ in said formulas (5), the difference of said concave surface from spherical surfaces becomes too small and, consequently, the effect to be attained by adopting the aspherical surface will become small. If it becomes $F > 0$, said difference becomes too large and it is not desirable for keeping aberrations balanced.

BRIEF DESCRIPTION OF THE DRAWINGS

FIG. 1 shows a sectional view of lens system according to Embodiments 1 through 5 of the present invention;

FIGS. 2A, 2B and 2C respectively show graphs illustrating aberration curves of the Embodiment 1;

FIGS. 5A, 5B and 5C respectively show graphs illustrating aberration curves of the Embodiment 4;

FIGS. 6A, 6B and 6C respectively show graphs illustrating aberration curves of the Embodiment 5;

FIG. 7 shows a sectional view of the lens system according to the Embodiment 6 of the present invention; and FIGS. 8A, 8B and 8C respectively show graphs illustrating aberration curves of the Embodiment 6.

DETAILED DESCRIPTION OF THE PREFERRED EMBODIMENTS

Figures 3A, 3B, 3C, 4A, 4B, 4C:
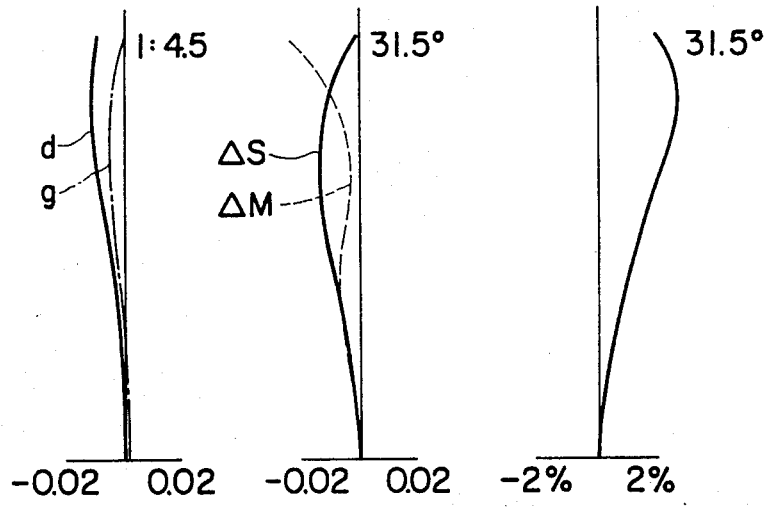
FIGS. 3A, 3B and 3C respectively show graphs illustrating aberration curves of the Embodiment 2.
FIGS. 4A, 4B and 4C respectively show graphs illustrating aberration curves of the Embodiment 3.

Preferred embodiments of the photographic lens system according to the present invention explained in the above are as shown below.

Embodiment 1
$r_1 = 0.21554$
$d_1 = 0.1014$         $n_1 = 1.62299$      $\nu_1 = 58.1$
$r_2 = -0.38921$
$d_2 = 0.0174$         $n_2 = 1.80440$      $\nu_2 = 39.6$
$r_3 = 0.35753$
$d_3 = 0.0957$
$r_4 = 1.08906$
$d_4 = 0.0493$         $n_3 = 1.66672$      $\nu_3 = 48.3$
$r_5 = -0.57852$
$d_5 = 0.1014$
$r_6 = -0.15688$
$d_6 = 0.0435$         $n_4 = 1.51633$      $\nu_4 = 64.2$
$r_7 = -0.36970$
$E = 0.1235 \times 10^2$
$F = -0.1493 \times 10^4$
$G = 0.1073 \times 10^6$
$H = -0.7535 \times 10^6$
$f_1 = 1.414$ , $f_3 = -0.567$
$S' = 0.487$ , $P = 0.896$ Embodiment 2
$r_1 = 0.21729$
$d_1 = 0.1012$         $n_1 = 1.62280$      $\nu_1 = 57.1$
$r_2 = -0.42111$
$d_2 = 0.0176$         $n_2 = 1.83400$      $\nu_2 = 37.2$
$r_3 = 0.36445$
$d_3 = 0.0945$
$r_4 = 1.12628$
$d_4 = 0.0491$         $n_3 = 1.66672$      $\nu_3 = 48.3$
$r_5 = -0.55153$
$d_5 = 0.1012$
$r_6 = -0.16558$
$d_6 = 0.0434$         $n_4 = 1.51633$      $\nu_4 = 64.2$
$r_7 = -0.38325$
$E = 0.1245 \times 10^2$
$F = -0.5946 \times 10^3$
$G = 0.5206 \times 10^5$
$H = -0.3086 \times 10^6$
$f_1 = 1.590$ , $f_3 = -0.606$
$S' = 0.446$ , $P = 0.910$ Embodiment 3
$r_1 = 0.21655$
$d_1 = 0.1013$         $n_1 = 1.62280$      $\nu_1 = 57.1$
$r_2 = -0.41052$
$d_2 = 0.0177$         $n_2 = 1.83400$      $\nu_2 = 37.2$
$r_3 = 0.36066$
$d_3 = 0.0947$
$r_4 = 1.12069$
$d_4 = 0.0492$         $n_3 = 1.66672$      $\nu_3 = 48.3$
$r_5 = -0.53469$
$d_5 = 0.1013$
$r_6 = -0.1628$
$d_6 = 0.0434$         $n_4 = 1.51633$      $\nu_4 = 64.2$
$r_7 = -0.38422$
$E = 0.5398 \times 10$
$F = -0.4996 \times 10^3$
$G = 0.4808 \times 10^5$
$H = -0.1629 \times 10^6$
$f_1 = 1.636$ , $f_3 = -0.596$
$S' = 0.503$ , $P = 0.910$ Embodiment 4
$r_1 = 0.22114$
$d_1 = 0.1011$         $n_1 = 1.67000$      $\nu_1 = 57.3$
$r_2 = -0.42318$
$d_2 = 0.0144$         $n_2 = 1.83400$      $\nu_2 = 37.2$
$r_3 = 0.32388$
$d_3 = 0.0983$
$r_4 = 1.22274$
$d_4 = 0.0491$         $n_3 = 1.66672$      $\nu_3 = 48.3$
$r_5 = -0.64515$
$d_5 = 0.1011$
$r_6 = -0.16128$
$d_6 = 0.0433$         $n_4 = 1.51633$      $\nu_4 = 64.2$
$r_7 = -0.30438$
$E = 0.8133 \times 10$
$F = 0.8612 \times 10^3$
$G = 0.6481 \times 10^5$
$H = -0.3608 \times 10^6$
$f_1 = 1.502$ , $f_3 = -0.741$
$S' = 0.514$ , $P = 0.922$ Embodiment 5
$r_1 = 0.21735$
$d_1 = 0.1017$         $n_1 = 1.62280$      $\nu_1 = 57.1$
$r_2 = -0.37831$
$d_2 = 0.0145$         $n_2 = 1.83400$      $\nu_2 = 37.2$
$r_3 = 0.36612$
$d_3 = 0.0988$
$r_4 = 0.99655$
$d_4 = 0.494$          $n_3 = 1.62374$      $\nu_3 = 47.1$
$r_5 = -0.45257$
$d_5 = 0.1017$
$r_6 = -0.16614$
$d_6 = 0.0436$         $n_4 = 1.51633$      $\nu_4 = 64.2$
$r_7 = -0.46848$
$E = 0.8003 \times 10$
$F = -0.7941 \times 10^3$
$G = 0.6248 \times 10^5$
$H = -0.3443 \times 10^6$
$f_1 = 1.719$ , $f_3 = -0.524$
$S' = 0.493$ , $P = 0.902$ In these days, there is high possibility to manufacture lenses of good quality by using plastic materials. Therefore, to manufacture an aspherical lens having an aspherical surface of small radius of curvature as above, a method to manufacture such lens by using plastic material may be considered besides the method to manufacture such aspherical lens directly from glass material. Besides, it is also known to manufacture an aspherical lens by providing a thin layer of plastic material on a surface of a spherical lens made of glass or plastic material so that the surface of said thin layer becomes an aspherical surface. The Embodiment 6 shows a lens system manufactured by such method. In this embodiment, a spherical lens is at first formed so that the thickness of the plastic layer to form the aspherical surface will become suitable for manufacture. Then, the aspherical layer is provided on the spherical surface of said spherical lens. That is, in FIG. 7, reference symbol $r'$ represents the radius of curvature of one surface of the spherical lens. On said spherical surface $r'$, the aspherical layer made of material having the refractive index $n'$ and Abbe's number $\nu'$ is formed for the range of about 0.276 diameter so that the thickness of said aspherical layer from the spherical surface $r'$ to aspherical surface $r_6$ on the optical axis becomes $d'$.

Embodiment 6

| | | |
|---|---|---|
| r₁ = 0.21171 | | |
| d₁ = 0.1013 | n₁ = 1.62280 | ν₁ = 57.1 |
| r₂ = −0.41978 | | |
| d₂ = 0.0177 | n₂ = 1.83400 | ν₂ = 37.2 |
| r₃ = 0.36454 | | |
| d₃ = 0.0947 | | |
| r₄ = 1.14089 | | |
| d₄ = 0.0492 | n₃ = 1.66672 | ν₃ = 48.3 |
| r₅ = −0.54446 | | |
| d₅ = 0.1013 | | |
| r₆ = −0.16634 | | |
| d' = 0.00029 | n' = 1.491 | ν' = 57.8 |
| r' = −0.17051 | | |
| d₆ = 0.0431 | n₄ = 1.51633 | ν₄ = 64.2 |
| r₇ = −0.38811 | | |
| | E = 0.42555 × 10 | |
| | F = −0.49109 × 10³ | |
| | G = 0.47535 × 10⁵ | |
| | H = 0.21743 × 10⁶ | |
| f₁ = 1.535 | , f₃ = −0.668 | |
| S' = 0.514 | , P = 0.911 | |

In the above-mentioned respective embodiments, reference symbols $r_1$ through $r_7$ respectively represent radii of curvature of respective lens surfaces, reference symbols $d_1$ through $d_6$ respectively represent thicknesses of respective lenses and airspaces between respective lenses, reference symbol $n_1$ through $n_4$ respectively represent refractive indices of respective lenses, reference symbols $\nu_1$ through $\nu_4$ respectively represent Abee's numbers of respective lenses, reference symbol S' represents the distance between the lens surface in the lens system closest to the image and the image plane, referency symbol P represents the telephoto ratio, and reference symbols E, F, G and H respectively represent coefficients in formulas (5).

As it is evident from the above embodiments and their aberration curves illustrated on accompanying drawings, the present invention provides a wide-angle photographic lens system having simple lens configuration and short overall length for which aberrations are corrected quite favorably.

We claim:

1. A wide-angle photographic lens system with a short overall length comprising a first, second and third lens components, said first lens component being a cemented doublet lens consisting of a positive lens and negative lens, said second lens component being a positive lens, and said third lens component being a negative meniscus lens, said wide-angle photographic lens system with a short overall length satisfying the following conditions (1) through (4), the surface $r_6$ on the object side of said third lens component being formed as an aspherical surface expressed by the following formulas (5) when the direction of the optical axis is represented by x axis and the direction perpendicular to the optical axis is represented by y axis:

1. $1.2f < f_1 < 1.8f$
2. $0.16 < n_2 - n_1 < 0.22$
3. $1.8 < -r_4/r_5 < 2.3$
4. $0.4f < -f_3 < 0.8f$ $$x = \frac{y^2}{r_6 + r_6\sqrt{1 - \left(\frac{y}{r_6}\right)^2}} + Ey^4 + Fy^6 + Gy^8 + Hy^{10} \quad (5)$$

$$E > 0, \quad F < 0, \quad G > 0$$

wherein reference symbol $f$ represents the focal length of the lens system as a whole, reference symbol $f_1$ represents the focal length of said first lens component, reference symbol $f_3$ represents the focal length of said third lens component, reference symbols $n_1$ and $n_2$ respectively represent refractive indices of said positive and negative lenses of said first lens component, and reference symbols $r_4$ and $r_5$ respectively represent radii of curvature of the front and rear surfaces of said second lens component.

2. A wide-angle photographic lens systems with a short overall length comprising a first, second and third lens component, said first lens component being a cemented doublet lens consisting of a positive lens and negative lens, said second lens component being a positive lens, and said third lens component being a negative meniscus lens, said wide-angle photographic lens system with a short overall length having numerical values as given below, the surface $r_6$ on the object side of said third lens component being formed as an aspherical surface expressed by formulas given below when the direction of the optical axis is represented by x axis and the direction perpendicular to the optical axis is represented by y axis:

| | | |
|---|---|---|
| r₁ = 0.21554 | | |
| d₁ = 0.1014 | n₁ = 1.62299 | ν₁ = 58.1 |
| r₂ = −0.38921 | | |
| d₂ = 0.0174 | n₂ = 1.80440 | ν₂ = 39.6 |
| r₃ = 0.35753 | | |
| d₃ = 0.0957 | | |
| r₄ = 1.08906 | | |
| d₄ = 0.0493 | n₃ = 1.66672 | ν₃ = 48.3 |
| r₅ = −0.57852 | | |
| d₅ = 0.1014 | | |
| r₆ = −0.15688 | | |
| d₆ = 0.0435 | n₄ = 1.51633 | ν₄ = 64.2 |
| r₇ = −0.36970 | | |

$$x = \frac{y^2}{r_6 + r_6\sqrt{1 - \left(\frac{y}{r_6}\right)^2}} + Ey^4 + Fy^6 + Gy^8 + Hy^{10}$$

$$E = 0.1235 \times 10^2$$
$$F = -0.1493 \times 10^4$$
$$G = 0.1073 \times 10^6$$
$$H = -0.7535 \times 10^6$$
$$f_1 = 1.414, \quad f_3 = -0.567$$
$$S' = 0.487, \quad P = 0.896$$

wherein reference symbols $r_1$ through $r_7$ respectively represent radii of curvature of respective lens surface, reference symbols $d_1$ through $d_6$ respectively represent thicknesses of respective lenses and airspaces between respective lenses, reference symbols $n_1$ through $n_4$ respectively represent refractive indices of respective lenses, reference symbols $\nu_1$ through $\nu_4$ respectively represent Abbe's numbers of respective lenses, reference symbol S' represents the distance between the lens surface in the lens system closest to the image and the image plane, reference symbol P represents the telephoto ratio, and reference symbols E, F, G and H respectively represent coefficients in the above formulas.

3. A wide-angle photographic lens system with a short overall length comprising a first, second and third lens components, said first lens component being a cemented doublet lens consisting of a positive lens and negative lens, said second lens component being a positive lens, and said third lens component being a negative meniscus lens, said wide-angle photographic lens system with a short overall length having numerical values as given below, the surface $r_6$ on the object side of said third lens component being formed as an aspherical surface expressed by formulas given below when the direction of the optical axis is represented by x axis and the direction perpendicular to the optical axis is represented by y axis:

$r_1 = 0.21729$
$\quad d_1 = 0.1012 \quad n_1 = 1.62280 \quad \nu_1 = 57.1$
$r_2 = -0.42111$
$\quad d_2 = 0.0176 \quad n_2 = 1.83400 \quad \nu_2 = 37.2$
$r_3 = 0.36445$
$\quad d_3 = 0.0945$
$r_4 = 1.12628$
$\quad d_4 = 0.0491 \quad n_3 = 1.66672 \quad \nu_3 = 48.3$
$r_5 = -0.55153$
$\quad d_5 = 0.1012$
$r_6 = -0.16558$
$\quad d_6 = 0.0434 \quad n_4 = 1.51633 \quad \nu_4 = 64.2$
$r_7 = -0.38325$ $$x = \frac{y^2}{r_6 + r_6\sqrt{1 - \left(\frac{y}{r_6}\right)^2}} + Ey^4 + Fy^6 + Gy^8 + Hy^{10}$$

$E = 0.1245 \times 10^2$
$F = -0.5946 \times 10^3$
$G = 0.5206 \times 10^5$
$H = -0.3086 \times 10^6$
$f_1 = 1.590 \quad, f_3 = -0.606$
$S' = 0.446 \quad, P = 0.910$ wherein reference symbols $r_1$ through $r_7$ respectively represent radii of curvature of respective lens surfaces, reference symbols $d_1$ through $d_6$ respectively represent thicknesses of respective lenses and airspaces between respective lenses, reference symbols $n_1$ through $n_4$ respectively represent refractive indices of respective lenses, reference symbols $\nu_1$ through $\nu_4$ respectively represent Abbe's numbers of respective lenses, reference symbol S' represents the distance between the lens surface in the lens system closest to the image and the image plane, reference symbol P represents the telephoto ratio, and reference symbols E, F, G and H respectively represent coefficients in the above formulas.

4. A wide-angle photographic lens system with a short overall length comprising a first, second and third lens components, said first lens component being a cemented doublet lens consisting of a positive lens and negative lens, said second lens component being a positive lens, and said third lens component being a negative meniscus lens, said wide-angle photographic lens system with a short overall length having numerical values as given below, the surface $r_6$ on the object side of said third lens component being formed as an aspherical surface expressed by formulas given below when the direction of the optical axis is represented by x axis and the direction perpendicular to the optical axis is represented by y axis:

$r_1 = 0.21655$
$\quad d_1 = 0.1013 \quad n_1 = 1.62280 \quad \nu_1 = 57.1$
$r_2 = -0.41052$
$\quad d_2 = -0.0177 \quad n_2 = 1.83400 \quad \nu_2 = 37.2$
$r_3 = 0.36066$
$\quad d_3 = 0.0947$
$r_4 = 1.12069$
$\quad d_4 = 0.0492 \quad n_3 = 1.66672 \quad \nu_3 = 48.3$
$r_5 = -0.53469$
$\quad d_5 = 0.1013$
$r_6 = -0.16428$
$\quad d_6 = 0.0434 \quad n_4 = 1.51633 \quad \nu_4 = 64.2$
$r_7 = -0.38422$ -continued $$x = \frac{y^2}{r_6 + r_6\sqrt{1 - \left(\frac{y}{r_6}\right)^2}} + Ey^4 + Fy^6 + Gy^8 + Hy^{10}$$

$E = 0.5398 \times 10$
$F = -0.4996 \times 10^3$
$G = 0.4808 \times 10^5$
$H = -0.1629 \times 10^6$
$f_1 = 1.636 \quad, f_3 = -0.596$
$S' = 0.503 \quad, P = 0.910$ wherein reference symbols $r_1$ through $r_7$ respectively represent radii of curvature of respective lens surfaces, reference symbols $d_1$ through $d_6$ respectively represent thicknesses of respective lenses and airspaces between respective lenses, reference symbols $n_1$ through $n_4$ respectively represent refractive indices of respective lenses, reference symbols $\nu_1$ through $\nu_4$ respectively represent Abbe's numbers of respective lenses, reference symbol S' represents the distance between the lens surface in the lens system closest to the image and the image plane, reference symbol P represents the telephoto ratio, and reference symbols E, F, G and H respectively represent coefficients in the above formulas.

5. A wide-angle photographic lens system with a short overall length comprising a first, second and third lens components, said first lens component being a cemented doublet lens consisting of a positive lens and negative lens, said second lens component being a positive lens, and said third lens component being a negative meniscus lens, said wide-angle photographic lens system with a short overall length having numerical values as given below, the surface $r_6$ on the object side of said third lens component being formed as an aspherical surface expressed by formulas given below when the direction of the optical axis is represented by x axis and the direction perpendicular to the optical axis is represented by y axis:

$r_1 = 0.22114$
$\quad d_1 = 0.1011 \quad n_1 = 1.67000 \quad \nu_1 = 57.3$
$r_2 = -0.42318$
$\quad d_2 = 0.0144 \quad n_2 = 1.83400 \quad \nu_2 = 37.2$
$r_3 = 0.32388$
$\quad d_3 = 0.0983$
$r_4 = 1.22274$
$\quad d_4 = 0.0491 \quad n_3 = 1.66672 \quad \nu_3 = 48.3$
$r_5 = -0.64515$
$\quad d_5 = 0.1011$
$r_6 = -0.16128$
$\quad d_6 = 0.0433 \quad n_4 = 1.51633 \quad \nu_4 = 64.2$
$r_7 = -0.30438$ $$x = \frac{y^2}{r_6 + r_6\sqrt{1 - \left(\frac{y}{r_6}\right)^2}} + Ey^4 + Fy^6 + Gy^8 + Hy^{10}$$

$E = 0.8133 \times 10$
$F = -0.8612 \times 10^3$
$G = 0.6481 \times 10^5$
$H = -0.3608 \times 10^6$
$f_1 = 1.502 \quad, f_3 = -0.741$
$S' = 0.514 \quad, P = 0.922$ wherein reference symbols $r_1$ through $r_7$ respectively represent radii of curvature of respective lens surfaces, reference symbols $d_1$ through $d_6$ respectively represent thicknesses of respective lenses and airspaces between respective lenses, reference symbols $n_1$ through $n_4$ respectively represent refractive indices of respective lenses, reference symbols $\nu_1$ through $\nu_4$ respectively represent Abbe's numbers of respective lenses, reference symbols S' represents the distance between the lens surface in the lens system closest to the image and the image plane, reference symbol P represents the telephoto ratio, and reference symbols E, F, G and H respectively represent coefficients in the above formulas.

6. A wide-angle photographic lens system with a short overall length comprising a first, second and third lens component, said first lens component being a cemented doublet lens consisting of a positive lens and negative lens, said second lens component being a positive lens, and said third lens component being a negative meniscus lens, said wide-angle photographic lens system with a short overall length having numerical values as given below, the surface $r_6$ on the object side of said third lens component being formed as an aspherical surface expressed by formulas given below when the direction of the optical axis is represented by $x$ axis and the direction perpendicular to the optical axis is represented by $y$ axis:

$r_1 = 0.21735$
  $d_1 = 0.1017$    $n_1 = 1.62280$    $\nu_1 = 57.1$
$r_2 = -0.37831$
  $d_2 = 0.0145$    $n_2 = 1.83400$    $\nu_2 = 37.2$
$r_3 = 0.36612$
  $d_3 = 0.0988$
$r_4 = 0.99655$
  $d_4 = 0.0494$    $n_3 = 1.62374$    $\nu_3 = 47.1$
$r_5 = -0.45257$
  $d_5 = 0.1017$
$r_6 = -0.16614$
  $d_6 = 0.0436$    $n_4 = 1.51633$    $\nu_4 = 64.2$
$r_7 = -0.46848$ $$x = \frac{y^2}{r_6 + r_6\sqrt{1-\left(\frac{y}{r_6}\right)^2}} + Ey^4 + Fy^6 + Gy^8 + Hy^{10}$$

$E = 0.8003 \times 10$
$F = -0.7941 \times 10^3$
$G = 0.6248 \times 10^5$
$H = -0.3443 \times 10^6$
$f_1 = 1.719$, $f_3 = -0.524$
$S' = 0.493$, $P = 0.902$ wherein reference symbols $r_1$ through $r_7$ respectively represent radii of curvature of respective lens surfaces, reference symbols $d_1$ through $d_6$ respectively represent thicknesses of respective lenses and airspaces between respective lenses, reference symbols $n_1$ through $n_4$ respectively represent refractive indices of respective lenses, reference symbols $\nu_1$ through $\nu_4$ respectively represent Abbe's numers of respective lenses, reference symbol S' represents the distance between the lens surface in the lens system closest to the image and the image plane, reference symbol P represents the telephoto ratio, and reference symbols E, F, G and H respectively represent coefficients in the above formulas.

7. A wide-angle photographic lens system with a short overall length comprising a first, second and third lens components, said first lens component being a cemented doublet lens consisting of a positive lens and negative lens, said second lens component being a positive lens, and said third lens component being a negative meniscus lens, said wide-angle photographic lens system with a short overall length having numerical values as given below, the surface $r_6$ on the object side of said third lens component being formed by an aspherical layer provided on a spherical surface and having an aspherical surface expressed by formulas given below when the direction of the optical axis is represented by $x$ axis and the direction perpendicular to the optical axis is represented by $y$ axis:

$r_1 = 0.21171$
  $d_1 = 0.1013$    $n_1 = 1.62280$    $\nu_1 = 57.1$
$r_2 = -0.41978$
  $d_2 = 0.0177$    $n_2 = 1.83400$    $\nu_2 = 37.2$
$r_3 = 0.36454$
  $d_3 = 0.0947$
$r_4 = 1.14089$
  $d_4 = 0.0492$    $n_3 = 1.66672$    $\nu_3 = 48.3$
$r_5 = -0.54446$
  $d_5 = 0.1013$
$r_6 = -0.16634$
  $d' = 0.00029$    $n' = 1.491$    $\nu' = 57.8$
$r' = -0.17051$
  $d_6 = 0.0431$    $n_4 = 1.51633$    $\nu_4 = 64.2$
$r_7 = -0.38811$ $$x = \frac{y^2}{r_6 + r_6\sqrt{1-\left(\frac{y}{r_6}\right)^2}} + Ey^4 + Fy^6 + Gy^8 + Hy^{10}$$

$E = 0.42555 \times 10$
$F = -0.49109 \times 10^3$
$G = 0.47535 \times 10^5$
$H = -0.21743 \times 10^6$
$f_1 = 1.535$, $f_3 = -0.688$
$S' = 0.514$, $P = 0.911$ wherein referece symbols $r_1$ through $r_7$ respectively represent radii of curvature of respective lens surfaces, reference symbols $d_1$ through $d_6$ respectively represent thicknesses of respective lenses and airspaces between respective lenses, reference symbols $n_1$ through $n_4$ respectively represent refractive indices of respective lenses, reference symbol $\nu_1$ through $\nu_4$ respectively represent Abbe's numbers of respective lenses, reference symbol S' represents the distance between the lens surface in the lens system closest to the image and plane, reference symbol P represents the telephoto ratio, and reference symbols E, F, G and H respectively represent coefficients in the above formulas.

* * * * *